Feb. 27, 1968
W. B. CHILCOTE
3,370,793
CONDUCTOR BARS
Filed April 30, 1965
2 Sheets-Sheet 2
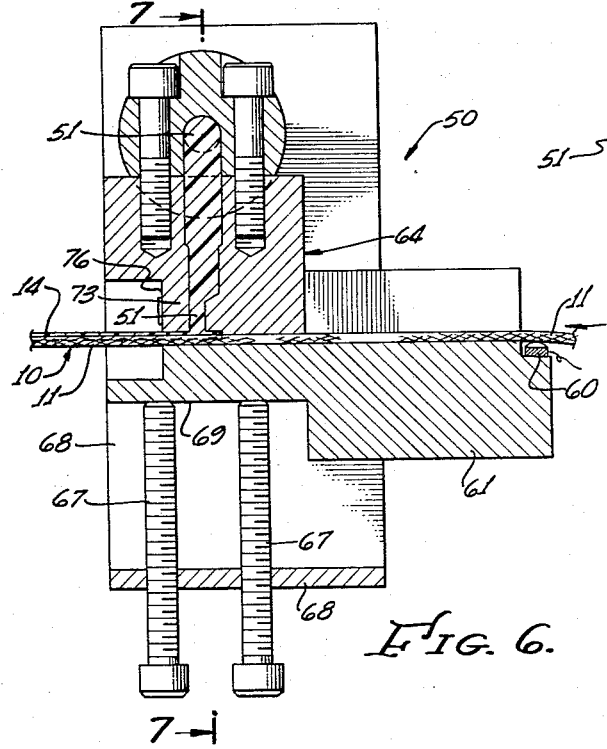
FIG. 6.
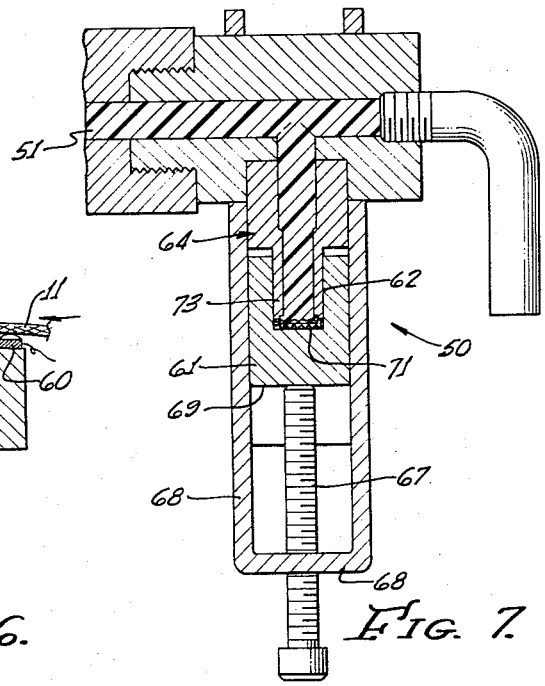
FIG. 7.
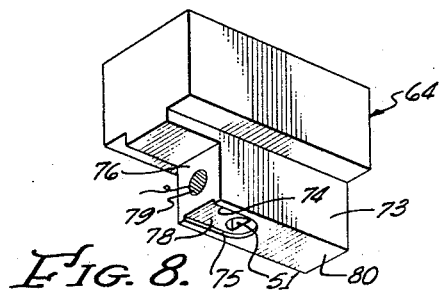
FIG. 8.
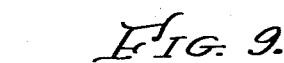
FIG. 9.
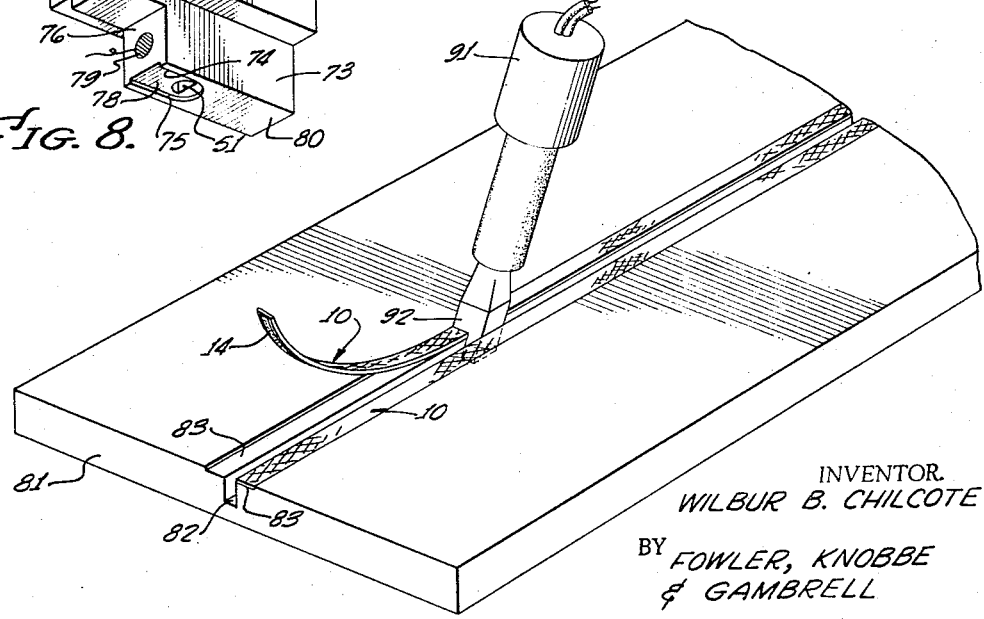
INVENTOR.
WILBUR B. CHILCOTE
BY FOWLER, KNOBBE
& GAMBRELL
ATTORNEYS.

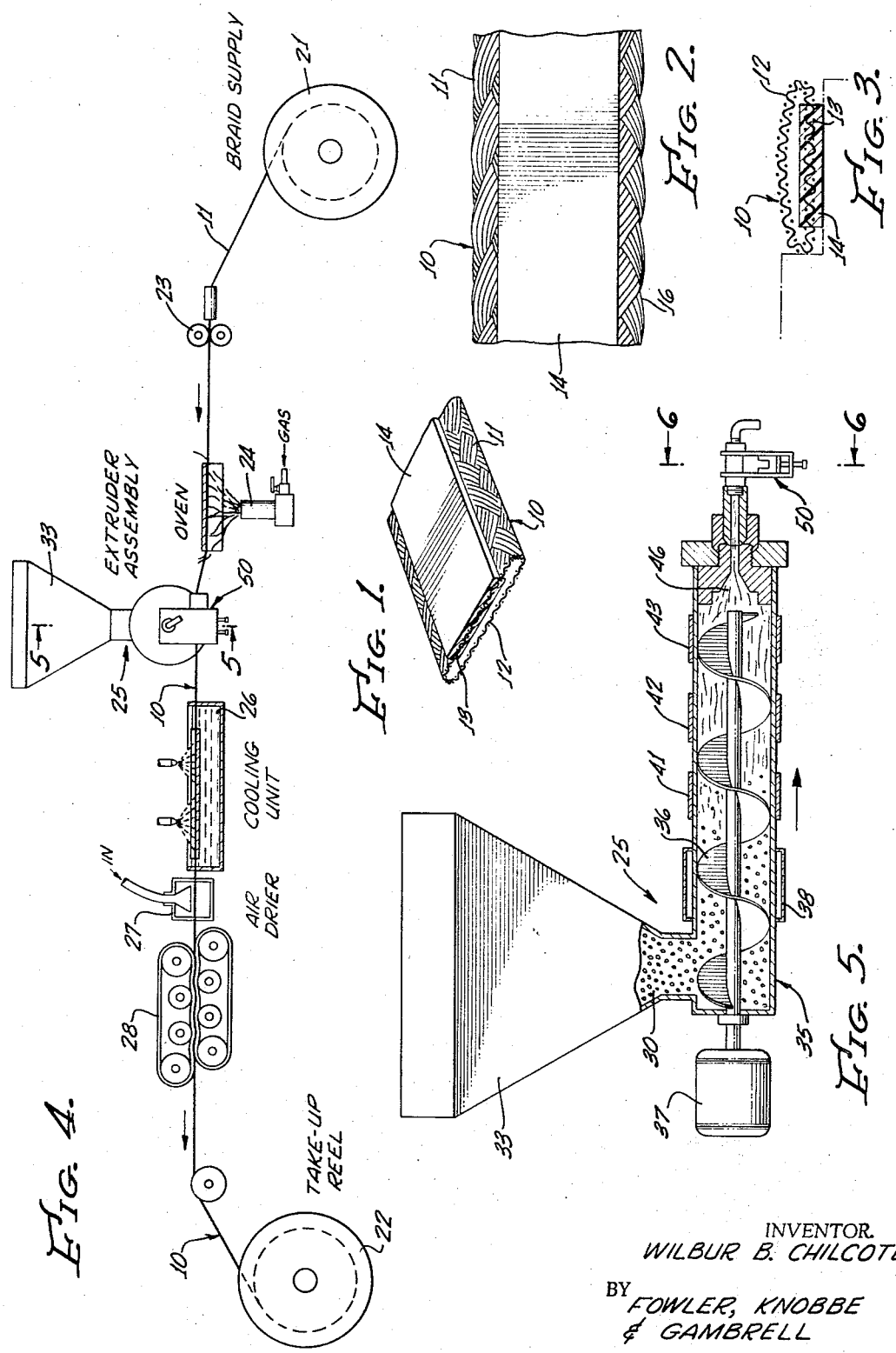

United States Patent Office 3,370,793
Patented Feb. 27, 1968

3,370,793
CONDUCTOR BARS
Wilbur B. Chilcote, 18172 Rainer Drive,
Santa Ana, Calif. 92705
Filed Apr. 30, 1965, Ser. No. 452,228
12 Claims. (Cl. 238—10)

ABSTRACT OF THE DISCLOSURE

A flexible, electrical conductor bar, especially suitable for conducting current to sliding contactors, in the form of a flattened, tubular braid of wire having a layer of normally non-tacky, thermoplastic vinyl resin attached to the surface of one side thereof. The resin is fusible by heat to a temporarily tacky condition. The conductor is formed by extruding a layer of heated resin onto an exposed side of the flattened conductor element and the layer attaches by at least partially filling the voids between the wires as the resin layer cools. The conductor is suitably attached to a surface by laying the conductor bar along the surface, such as a slot track roadbed, in preselected position with the resin contacting the surface and moving a heated hand iron or soldering iron with pressure along the opposite side of the conductor bar from the resin layer whereby the resin is heated to a temporarily tacky condition and attaches the conductor to the surface.

Background of the invention

This invention relates to bus bars and, more particularly, to flexible slip-ring type conductor bars and a method of forming and attaching them to a support surface.

In many fields, it is desirable to provide conductor bars for cooperation with one or more sliding contactors which act to transfer current from the conductor bars to electrical equipment associated with the sliding contactors. For example, in the field of miniature car racing, one or more conductor bars or strips are provided along the edges of a guide slot to provide current for operating the motors of individual slot cars. The slot cars utilize a pair of braided or solid contactors which ride on the conductor bars to transfer the current to the self-contained motors.

Conductor bars for slot car races and the like are often formed of braided conductive wires so as to impart the necessary flexibility to the conductor bar. Irrespective of their construction, however, conductor bars have most often been attached to the road surface of the slot car track by applying glue to the roadbed and to the back side of the conductor bar, and thereafter holding the components together until the glue sets.

Previous efforts along this line have been more or less unsatisfactory, or at least inefficient, for a number of reasons. For one thing, the difficulty of applying a glue to one side only of the conductor and the part of the track surface underlying it, is difficult. The adhesive quite often has not bonded the two together sufficiently well to prevent the conductor bar from becoming loose as the race track is used and, in many cases, some of the glue will end up on the upper surface of the conductor bar that is engaged by sliding contactors. If the latter occurs, it will degrade the transfer of current and interfere with the proper operation of the slot car motors. Over and above these difficulties, it takes a lot of time and patience to position a conductor bar properly with respect to the roadbed and to glue it to the roadbed.

The principal object of the present invention is to provide an improved conductor bar constructed so that it can be simply and easily attached to the road surface of a slot car race track or the like.

To obtain this broad object, the conductor bar is formed of a plurality of braided or non-woven conducting filaments to which is applied a strip or layer of a selected thermoplastic resin. The application of heat and light pressure is enough to bond the flexible conductor bar to the roadbed along a desired path.

More specifically, the conductor bar is formed of a tubular sleeve of braided wires which are flattened into a double layer strip and a relatively thin layer of resin interstitially locked in the outer part of one side only of the strip.

The conductor bar system is obtained by extruding a relatively thin layer of flexible thermoplastic rein along the center part of one side of a braided, double layer sleeve so that a part of the resin fills the interstices of one layer of the braid to hold the layer of resin in place, placing the conductor bar on the roadbed surface of a slot car track with the resin side down, and applying heat to the exposed surface of the sleeve. The heat causes the resin to become tacky and, upon cooling, bonds the braided conductor bar to the track surface.

In some cases, there are provided a pair of parallel, rectangular grooves alongside the slot which guides slot car racers as they move around the track. The conductor bars are disposed in these grooves so that their upper surfaces lie in the plane of the roadbed and do not cause any discontinuities in the surface of the roadbed.

When such a track is employed, a length of the conductor bar is placed in each groove with the layer of thermoplastic resin facing downward, and a hand iron or modified soldering iron is run along its length to cause the resin to become sticky and bond the braided conductor to the track surface.

The conductor bar forming the present invention is itself constructed by a process comprising the steps of forming a flexible and continuous tubular sleeve of a porous electrically conducting material, flattening the sleeve to form a double layer conductive strip, preheating the flattened strip, extruding a layer of resilient thermoplastic resin along the center of the exposed side of one layer of the strip and affixing it thereto by filling at least part of the voids of said one side, and cooling the conductor strip and layer of resin attached thereto.

In order to obtain the benefits of the present invention, it is extremely important that the proper type of resin be employed. Copolymers of ethylene and vinyl acetate have been found to work quite well. Specifically, a 72 percent ethylene and 28 percent vinyl acetate marketed under the trade name "Elvax 250" by the Du Pont Chemical Company works well. Some variation in the amounts of the constituents or the constituents themselves can be tolerated. In fact, there is no limitation on the constituents as long as comparable properties can be obtained. The resin must be tacky when hot and fairly flexible after cooling so that the conductor bar will maintain enough resilience to perform satisfactorily in its intended environment. It is also important that the resin be one which can be reheated within the sensible ranges of temperatures available in conventional heat sources such as hand irons and soldering irons so that the conductor bar can be bonded to the track surface easily and without requiring the use of elaborate equipment.

These and other objects, features and advantages of the present invention will be more fully understood when the following detailed description is read with reference to the drawings, in which:

FIG. 1 is a perspective of a section of an improved conductor bar formed in accordance with the present invention;

FIG. 2 is a plan view of the resin-backed side of the conductor bar formed in accordance with the present invention;

FIG. 3 is an end view taken along line 3—3 of FIG. 2 illustrating the manner in which the resin fills the interstices of one layer of the braided conductor formed in accordance with the present invention;

FIG. 4 is a schematic diagram of the processing operations involved in fabricating an improved conductor bar in accordance with the present invention;

FIG. 5 is a schematic diagram of the plastic supply chamber and the extruding die with certain parts cut away for clarity which is used to form the layer of resin on the supporting layer of the braided conductive sleeve;

FIG. 6 is a side section view of the die taken along lines 6—6 of FIG. 5 illustratng the manner in which the braided sleeve moves through the die while a layer of resin is deposited on and through one surface thereof;

FIG. 7 is a section view through the die cavity taken along lines 7—7 of FIG. 6;

FIG. 8 is a perspective looking towards the die cavity in the extrusion head; and, FIG. 9 is a perspective illustrating the way in which an improved conductor bar formed in accordance with the present invention is attached to the surface of an exemplary slot car roadbed.

The improved conductor bar of the present invention is illustrated most clearly in FIGS. 1–3. The conductor bar 10 includes a tubular sleeve 11 of tightly braided groups of conductive wires flattened to form an outer layer 12 and a supporting layer 13, and a layer of thermoplastic resin 14 deposited on the exposed surface of the supporting layer 13 and locked thereto by filling the interstices thereof. As can be seen most clearly in FIG. 3, the layer of resin 14 substantially fills the voids between the conductive wires in the supporting layer 13 to securely affix the layer 14 to the double-layer braided sleeve 11. As a matter of fact, the pressure of the resin as it is extruded is chosen to cause the resin—taking into account the thickness of the layer 14 of resin desired and the "pick count" of the braid—to just flow into the void of the supporting layer 13 and not intrude into the outer layer 12. When the sleeve is hereinafter described as braided, it should be understood that a non-woven configuration is also envisioned.

The braided sleeve 11 is formed to maintain a density factor for the wires of approximately 80 to 90 percent. This assures that each wire substantially touches adjacent wires. If the density of the wires, i.e., the percentage of available area taken up by conducting wires or filaments, falls much below 80 percent, the braid will not maintain its width on stretching. It will instead "neckdown" and tend to buckle when installed on the track. Moreover, it will create the likelihood that the resin will "bleed through" the first layer 13 of the braid when it is applied.

By way of example, a ¼" wide conductor bar may be formed by 24 total carriers or picks, each of which contains seven .005" diameter wires. The braid is designed to give approximately 9½ picks per linear inch of braid. An exemplary wire which may be used is a No. 36 gauge, tinned copper wire. One source is the Prestolite Wire and Cable Company of Muskegon, Michigan. If a 5/16" wide conductor bar is desired, the pick is reduced from seven to five wires, which keeps the density factor about the same.

With either width conductor bar, the overall thickness of the double layer conductor sleeve is approximately .020 to .030 inches. The thickness of the layer of resin is kept to approximately .010 to .015 inches so that the overall thickness of flattened sleeve 11 and resin layer 14 is kept between .040 and .045 inches. If the resin layer is increased, it causes the resin to migrate into the upper layer 12 or to spill out around the sides of the flattened sleeve 11. In either case, it will interfere with the surface 19 of the conductor bar 10 which is designed to cooperate with sliding contactors.

Not only is it desirable to avoid interfering with the electrical properties of that part of the conductor bar which is contacted by the sliding contactors (not shown), but it is also desirable inasmuch as the supporting layer 13 of the sleeve 11 acts to resiliently, and to some extent flexibly, support the outer layer 12 in a convex shape (as exaggeratedly illustrated in FIG. 3) so that good contact with the sliding contactors is assured as they move over the outer surface 19 of the layer 12.

It will also be observed in connection with FIGS. 1–3 that the margins of the layer 14 terminate inwardly from the outer edges 16 of the flattened sleeve 11 so that, when the conductor bar is attached to a relatively rigid surface such as 18, there is no possibility that the resin will flow out and around the edges 16 and onto the exposed surface 19 of the outer layer 12. If this were to occur, of course, it would interfere with the low resistance contact between the conductor bar surface 19 and sliding contactors (not shown) which cooperate with it. If the width of the resin layer is approximately one-half of the total width of the flattened conductor sleeve 11, the conductor bar 10 has been found to perform quite well.

A schematic representation of the apparatus employed to form the improved conductor bar in accordance with the present invention is depicted in FIG. 4. A supply of the continuous, flattened double-layer sleeve 11 is rotatably supported on reel 21. The flattened sleeve 11 on reel 21 is passed through a pair of guide rollers 23 and a preheated oven 24 wherein the braided sleeve 11 is heated to a temperature in excess of approximately 150° F. (and preferably around 400° F.) so that the extruded resin, which is at approximately 400° F., will form a good bond on the wires forming the porous sleeve 11. After the sleeve 11 is preheated in the oven 24, it is passed through the die assembly 25 adjacent the die cavity 50 where the thin layer of plastic resin 14 is deposited thereon and locked in the interstices of the supporting layer as described hereinbefore. The conductor bar, including both the sleeve 11 and the layer of resin 14, is thereafter passed through a cooling unit 26, where water contacts the conductor bar and resin strip to harden the resin, and an air drier 27 wherein the water is removed prior to storage.

The feed mechanism 28, which consists of a series of closely spaced pressure rollers cooperating with a pair of continuous belts, pull the sleeve 11 through the heater 24, die assembly 25, air drier 27 and the cooling unit 26. The conductor bar 10 moves through the feed mechanism 28, over a guide roller 31 and is stored on the takeup reel 22.

FIG. 5 illustrates the apparatus forming the extruding die assembly or extruding machine 25. It includes a storage hopper 33 which stores a plurality of pellets 30 of thermoplastic resin of the desired type. The pellets 30 are gravity fed to the inlet of a longitudinal extruding chamber 35. The resin is moved through the preheating chamber 35 by a helical screw 36 which is rotated by an electric motor 37. As the pellets are moved along by the blades of helical screw 36, they pass first through a section of the longitudinal chamber 35 which is maintained relatively cool as a result of cooling jacket 38. Thereafter, the chamber 35 has a series of heating coils or other heat sources 41, 42 and 43 formed about its circumference.

The cooling jacket 38 is provided near the throat of the screw 36 to make certain that the resin pellets 30 move fully interior of the chamber 35 before they are melted for entrance into the die cavity proper, otherwise, the pellets 30 tend to stick together and block the throat of the supply bin 33.

As the pellets 30 are moved along the chamber 35 by the heilcal screw 36, the spaced-apart heating bands 41, 42 and 43 cause the pellets 30 to melt so that upon reaching the die throat 46, the resin is a liquid and may be forced through the sprue hole 51 which is in communication with the die cavity 78, as hereinafter described in more detail.

In the exemplary apparatus, the cooling jacket 38 is circulated with tap water and the heating jackets 41, 42 and 43 cooperate to establish the liquid resin at the die cavity 78 at approximately 400° F. This is detected by a sensing thermometer 79 which is attached to the front surface 76 of the extrusion head 64. A second sensing thermometer 60 is attached to the base member 61 of the die 50. It contacts sleeve 11 and detects the temperature of the sleeve 11 immediately before it enters the die 59. As noted, it has been found desirable to maintain the resin and the sleeve 11 at approximately 400° F. to obtain a good bond.

The die 50 is more particularly illustrated in FIGS. 6–8. It principally includes a base member 61 having a U-shaped, longitudinal guideway 62 in its upper surface and an extrusion head 64.

A U-shaped support bracket 66 is adapted to fit around the base member 61 and has a pair of screws 67 threaded through the bit 68 of the U to bear against the lower surface 69 of the base member 61 to permit an adjustment of the separation between the lower surface of the extrusion head 64 and the bed 71 of the U-shaped guideway 62 to be made as needed. This permits the die 50 to accommodate braided sleeves 11 of different thicknesses. Only a slight adjustment of the thickness of the deposited layer of resin 14 and the degree of intrusion of the resin into the supporting layer 13 can be effected by this adjustment.

The extrusion head 64 has a depending, rectangularly shaped portion 73 which has a pair of downwardly extending shoulders 74, 75 on each side of its forward end 76. These shoulders define a rectangularly shaped die cavity 78 (see FIG. 8). The die cavity 78 is in fluid communication with the throat 46 of the die way of sprue hole 51. As shown, the sprue hole 51 enters the die cavity 78 at its rear end and makes a right angle turn interior of the extrusion head 64.

The cross-section of the depending member 73 is proportioned to fit snugly interior of the guideway 62 which is formed in the base member 61. As the flattened double layered sleeve 11 is moved between the lower surface 80 of the depending end 73 and the bed 71 of the base member 61, the thermoplastic resin is forced into the interstices of the supporting layer 13. The thickness of layer 14 of thermoplastic resin formed therealong is determined primarily by the height of the shoulders 74, 75 which define the die cavity 78. In the exemplary embodiment of the invention, the shoulders 74, 75 are approximately 10 to 15 mils high.

The pressure at the die cavity 78 is selected to maintain the proper penetration of the resin into the supporting layer 13 of the sleeve 11. With the resin at approximately 400° F., as detected by the sensing thermometer 80, the speed of screw 36 of the extruding machine or die assembly 25 and the linear speed at which the sleeve 11 moves through the machine 25 are selected to assure proper penetration into the supporting layer 13. For example, with a 1½" extruding machine and the linear speed of the sleeve 11 through the die assembly 25 set at approximately 80 feet per minute, the motor 37 is set to rotate the screw 36 at approximately 25 r.p.m. If the rate of movement of sleeve 11 is reduced, then the r.p.m.'s of the screw 36 would be correspondingly reduced. Or, if a smaller extruding machine is used, then the screw 36 would have to be speeded up to deliver the same volume of resin per unit length of sleeve 11 passing through the extrusion head 64.

If the volume of the resin per linear lentgh of the sleeve 11 moving through the head is excessive, the resin will either migrate around the shoulders 74 and 75 which define the die cavity and flow into the interstices of the outer layer 12 of the sleeve 11 or intrude into the interstices of the outer layer 12 by way of layer 13. Both results will cause difficulty when the track is in use. On the other hand, if too little resin is extruded onto the supporting layer 13 of the sleeve 11, then the amount of resin will be inadequate to properly lock the resin interior of the layer 13 or to provide an adequate bonding matrix for the conductor bar 10 when it is attached to a supporting surface.

FIG. 9 illustrates the simple manner by which a conductor bar formed in accordance with the present teaching may be installed on the roadbed of a slot car racer or other relatively rigid backing surface. In the embodiment illustrated, there is shown a roadbed 81 having a guide slot 82 and a pair of rectangular slots 83 on each side thereof which receive conductor bars 10 formed in accordance with the present invention. Once a conductor bar 10 is formed with the layer of thermoplastic resin 14 thereon, it is a simple matter to place the resin side down in each of the slots 83, and run a hand iron or modified soldering iron over the exposed surface 19 of the conductor bar 10. This causes the resin to become tacky so that the flexible sleeve is bonded to the roadbed 81. The finished product provides a pair of flexible conductor bars 10 immediately adjacent each side of a guide slot 82 with their surfaces 19 lying in the plane of the roadbed 81.

In FIG. 9, a soldering iron 91 with a modified tip 92 is shown bonding the bar 10 to the roadbed 81. The tip 92 has a pair of stepped flat surfaces, the lowermost one of which rides in slot 82 to guide the tip 92 as the other surface bears against the outer surface 19 of the bar 10.

As is apparent from the foregoing description, the conductor bar 10 of the present invention is easily formed, simply installed and incorporates the necessary resiliency, both in the braided sleeve and the bonding resin, to provide long lasting conductor bars as required for the many applications.

Although this invention has been described primarily with respect to slot car race tracks, it should be apparent that persons skilled in the art can envision certain modifications thereof and other related uses without departing from the spirit and scope of the invention. For this reason, the invention should only be limited to the extent of the appended claims.

What is claimed is:

1. A flexible electrical conductor bar bondible to a rigid base by light pressure and heat comprising:
    a flexible conductor element; and
    a normally non-tacky layer of a flexible thermoplastic resin attached to a surface of the conductor element, said layer being fusible by heat to a temporarily tacky condition.

2. A flexible conductor bar assembly for conducting current to sliding contactors comprising:
    a flexible, porous, electrical conductor bar having an exposed conducting surface; and
    a layer of flexible resin attached to the opposite surface filling the interstitial voids of at least part of the porous bar thickness, said resin layer being heat convertible to a tacky condition without migrating to the exposed surface.

3. An electrical conductor bar assembly designed to cooperate with the sliding contactors of slot car racers and the like in accordance with claim 2, wherein the porous conductor bar is a flexible braided sleeve flattened so that the segment of the sleeve having the layer of resin thereon resiliently supports the exposed part of the sleeve which is contacted by the sliding contactors.

4. A slot car race system and the like comprising in combination:
    (a) a roadbed having at least one guide slot formed in its upper surface
    (b) a bus bar of a flexible strip of porous electrically conductive material attached to the surface of the roadbed on each side of the guide slot by means of a layer of thermoplastic adhesive attached to one of said strip and bonded to the surface of the roadbed after cooling from a heated temporarily tacky condition.

5. A slot car racer system in accordance with claim 4, wherein the flexible strips are formed of a plurality of groups of conducting wires in a flattened, braided configuration, the adhesive is a thermoplastic resin which is non-tacky and stable for the range of operating temperatures normally encountered in use of the bus bars, and the layers of resin are attached to the strips by filling the interstices of parts of the adjacent surfaces.

6. A slot car racer system in accordance with claim 5 wherein the layers of resin are approximately 10 to 15 mils in thickness and the width of the layers of resin are approximately one-half the width of the flattened strips of conductive material.

7. A flexible conductor assembly adapted to be attached to the roadbed of a slot car race track or the like by the application of local heat and pressure to its upper surface comprising, in combination,
 (a) a braided sleeve of groups of conductive filaments flattened substantially into a double-layer strip; and,
 (b) a resilient coating of thermoplastic resin interstitially locked into the voids of the braided sleeve along the center part of the lower surface of one layer of said strip.

8. A flexible conductor assembly adapted to be attached to the roadbed of a slot car race track or the like by the application of local heat and pressure in accordance with claim 4 wherein the resin is a co-polymer of ethylene and vinyl acetate and the coating is approximately one-half of the width of the flattened double-layer strip.

9. In the field of miniature car racing and the like wherein slip ring-like conductor bars are provided on the surface of a roadbed to provide current by way of brush contactors for operating self-contained motors of individual slot cars, the improvement in conductor bars comprising:
 (a) a conductor bar formed of a relatively flat, flexible braid of conductive wires; and,
 (b) a normally non-tacky, thermoplastic resin strip on one side of the braid locked in the interstices of the braid but not extending through to the other side thereof;
 (c) said thermoplastic resin strip becoming tacky upon the application of heat to the conductor bar to cause it to bond the flexible braid to the roadbed.

10. The improvement in conductor bars for miniature car racing and the like in accordance with claim 9, wherein the braid is a tubular sleeve flattened to provide a double thickness conductor bar bonded to the roadbed adjacent one thickness so that said one thickness resiliently supports the other thickness for engagement by the contactors of slot cars as they move over the roadbed of the race track.

11. The improvement in conductor bars for miniature racing and the like in accordance with claim 10 wherein the wires of the sleeve are braided in a plurality of picks to provide a density factor of approximately 80 percent.

12. The improvement in conductor bars for miniature racing and the like in accordance with claim 11 wherein the thickness of the double layers is approximately 25 mils, the thickness of the resin layer is approximately 10 mils and the resin layer width is approximately one-half the width of the flattened layers of said sleeve.

References Cited
UNITED STATES PATENTS

| 1,478,979 | 12/1923 | Stoehrer et al. | 191—13 |
| 3,016,845 | 1/1962 | Lemelson | 104—148 |

FOREIGN PATENTS

| 980,078 | 1/1965 | Great Britain. | |

ARTHUR L. LAPOINT, *Primary Examiner.*

R. A. BERTSCH, *Assistant Examiner.*